Aug. 2, 1938.  J. N. JUNKINS  2,125,297

OXIDIZING ELEMENTAL PHOSPHORUS

Filed Aug. 4, 1936

John N. Junkins
INVENTOR

BY Arthur L. Davis
ATTORNEY

Patented Aug. 2, 1938

2,125,297

UNITED STATES PATENT OFFICE 2,125,297

OXIDIZING ELEMENTAL PHOSPHORUS

John N. Junkins, Sheffield, Ala.

Application August 4, 1936, Serial No. 94,243

2 Claims. (Cl. 23—165)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process of and an apparatus for volatilizing and oxidizing elemental phosphorus.

One of the objects of this invention is to provide an effective method and suitable apparatus for the volatilization of elemental phosphorus. Another object of this invention is to utilize effectively the heat of combustion of the elemental phosphorus in effecting its vaporization prior to substantial oxidation. Other objects of this invention include the provision of a means for producing a gaseous mixture containing phosphorus pentoxide from elemental phosphorus suitable for making phosphoric acids and phosphates.

I have discovered a new and improved method for volatilizing and oxidizing elemental phosphorus. The elemental phosphorus is admitted to a heated hearth over which is passed a quantity of heated air sufficient to complete the vaporization of the elemental phosphorus but insufficient to oxidize any substantial proportion of the elemental phosphorus. The oxidation of the elemental phosphorus is carried to completion by admitting at least a sufficient quantity of air to the vaporized and partially oxidized elemental phosphorus to accomplish this result. The hearth is heated by an external heat-exchange relationship with the combustion products. The air passed over the surface of the hearth is preheated by an internal heat-exchange relationship by the hearth and its supports.

I have also discovered an apparatus for carrying out my invention which comprises an elevated refractory hearth within a combustion chamber with a plurality of inlets for the primary combustion air passed through the plurality of discontinuous refractory hearth supports so arranged to deliver the preheated air to the surface of the elemental phosphorus on the hearth, a plurality of inlets for the secondary combustion air to the top of the furnace and an outlet for the final products of combustion communicating with a passageway in heat-exchange relationship with the hearth.

Figure 1:
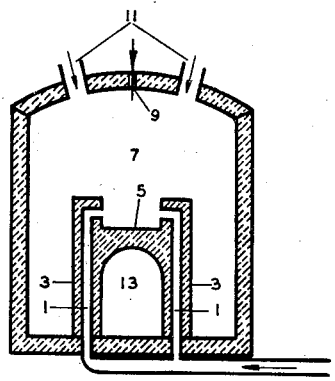
Figure 2:
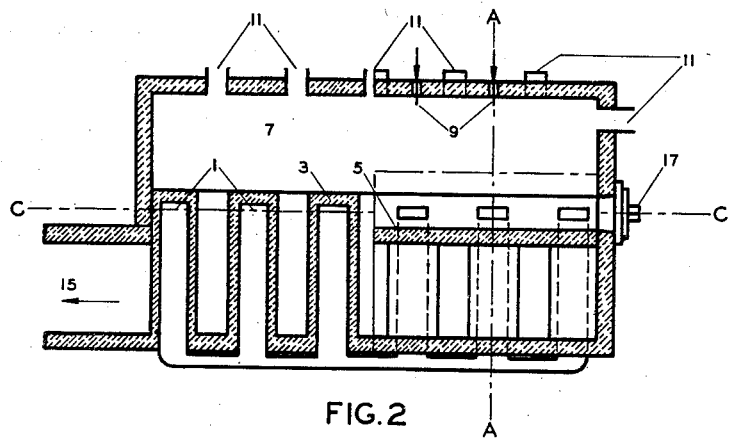
Figure 3:
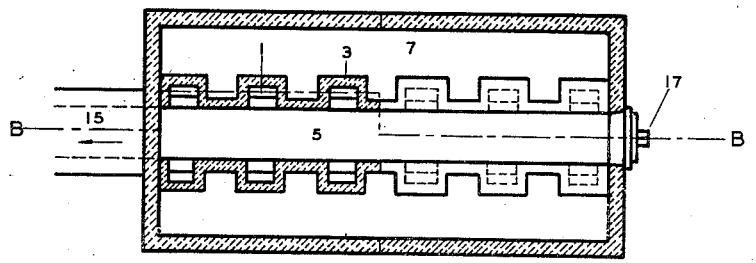

In the accompanying drawing, which forms a part of the specification, and wherein reference symbols refer to like parts whenever they occur, Fig. 1 is a diagrammatic, vertical, cross sectional view of one form of apparatus for the embodiment of my invention taken substantially through A—A of Fig. 2;

Fig. 2 is a diagrammatic, vertical, longitudinal, sectional view of the apparatus shown in Fig. 1 taken substantially through B—B of Fig. 3, and Fig. 3 is a diagrammatic, sectional, plan view of the apparatus shown in Fig. 1 taken substantially through C—C of Fig. 2.

In Fig. 1, the primary air is preheated through a plurality of inlets, represented by inlets 1, through the discontinuous supports, represented by supports 3, of the hearth 5, all the above being located within the combustion chamber 7. Elemental phosphorus is admitted through the inlet 9, dropped onto the hearth 5, and is vaporized and partially oxidized by the heat supplied by the hearth 5, and the primary air delivered by the inlets 1. Secondary combustion air is admitted through a plurality of inlets represented by inlets 11, to complete the oxidation of all of the elemental phosphorus within the combustion chamber 7. The resulting mixture containing phosphorus pentoxide passes between the discontinuous supports from the hearth 5, represented by supports 3, and into the passageway 13, which serves to bring the hot combustion products in external heat-exchange relationship with the hearth 5. The combustion products so partially cooled leave the passageway 13, and the combustion chamber through an outlet not shown in this figure.

In Fig. 2 and Fig. 3 there is shown, in addition to the elements shown in Fig. 1, an outlet 15, communicating with the passageway 13, underneath the hearth 5. At least one cleanout door, represented by door 17, is provided in the end of the combustion chamber at the elevation of the top of the hearth so that non-volatile impurities carried by the phosphorus, partially oxidized and non-volatile phosphorus compounds of known composition, may be withdrawn from the hearth periodically.

It is evident that there are numerous factors which will influence conditions for the most satisfactory operation of my invention, the actual limits of which cannot be established except by a detailed study of each set of raw materials and the intermediate and finished products involved.

The elemental phosphorus may be produced by any known means such as by the reduction of a charge of phosphate rock, silica and coke in a blast furnace to produce a phosphate reduction furnace gas containing 0.7 to 1.0% of elemental phosphorus or by the reduction of a charge of phosphate rock, silica and coke in an electric furnace to form a phosphate reduction furnace gas containing 8 to 10% elemental phosphorus. This invention contemplates the use of solid or liquid elemental phosphorus or mixtures containing the same which has been separated from such gases by direct or indirect condensation. The phosphorus is to be oxidized to phosphorus pentoxide as an intermediate step either to the condensation of the phosphorus pentoxide or the production of phosphoric acids or phosphates.

The solid or liquid elemental phosphorus is admitted to the top of a heated hearth so constructed that the primary air is preheated by passing through its discontinuous supports with the flow of the preheated air so diverted as to be directed at the surface of the phosphorus on the hearth. In this manner the elemental phosphorus is volatilized due to the effect of the heat from the hearth, the preheated air and the heat from the partial combustion of the phosphorus. This primary preheated air is admitted in an amount insufficient to oxidize completely the elemental phosphorus. In other words it is preferable in this stage of the process to oxidize only a very limited amount of the elemental phosphorus.

At least a sufficient amount of secondary air is admitted to the combustion chamber to oxidize completely the remainder of the elemental phosphorus and, if necessary, to oxidize lower oxides of phosphorus to the highest valence.

The ultimate products of combustion pass between the discontinuous hearth supports of the hearth and through the passageway beneath the hearth, in this manner serving to preheat the hearth itself, and are withdrawn through at least one outlet for further processing in the utilization of the phosphorus pentoxide contained therein.

It will be seen, therefore, that this invention actually may be carried out by the modification of certain details without departing from its spirit or scope.

I claim:

1. Process of oxidizing elemental phosphorus using a primary air supply sufficient to vaporize all of the phosphorus and at the same time sufficient to oxidize only a limited amount of the elemental phosphorus and a secondary air supply sufficient to at least convert all the partially oxidized and unoxidized phosphorus to phosphorus pentoxide and to form a hot gaseous mixture containing the latter, which comprises, introducing the phosphorus into an uncovered liquid confining zone substantially centrally located in a surrounding gas confining zone, passing the primary air in heat exchanging relationship with the hot gaseous mixture containing the phosphorus pentoxide, admitting the heated primary air to the gas confining zone immediately above the surface of the phosphorus contained in the liquid confining zone to form a gaseous mixture of partially oxidized and unoxidized elemental phosphorus, admitting the secondary air to the gas confining zone so that it will be mixed with the gaseous mixture of partially oxidized and unoxidized elemental phosphorus to form the hot gaseous mixture containing phosphorus pentoxide, and passing the hot gaseous mixture containing phosphorus pentoxide from the gas confining zone in adjacent heat exchanging relationships to both the primary air and the liquid confining zone.

2. Step of vaporizing in the process of oxidizing elemental phosphorus using a primary air supply sufficient to vaporize all of the phosphorus and at the same time sufficient to oxidize only a limited amount of the elemental phosphorus and a secondary air supply sufficient to at least convert all the partially oxidized and unoxidized phosphorus to phosphorus pentoxide and to form a hot gaseous mixture containing the latter which comprises, introducing the phosphorus into an uncovered liquid confining zone, and passing the hot gaseous mixture containing phosphorus pentoxide from the gas confining zone in adjacent heat exchanging relationships to the primary air supply for vaporization and partial oxidation of the phosphorus and in direct heat exchanging relationship with the bottom of the liquid confining zone to completely vaporize the elemental phosphorus.

JOHN N. JUNKINS.